United States Patent
Hughes et al.

(10) Patent No.: US 6,395,170 B1
(45) Date of Patent: May 28, 2002

(54) UNIVERSAL FILTER FOR SODA POP AND BOTTLED WATER BOTTLES

(76) Inventors: Douglass E. Hughes, 3457 Iris Ct., Boulder, CO (US) 80304; Raymond G. Bryan, 173 Nottingham Ct., Reno, NV (US) 89511

(*) Notice: Subject to any disclaimer, the term of this patent is extended or adjusted under 35 U.S.C. 154(b) by 0 days.

(21) Appl. No.: 09/525,106

(22) Filed: Mar. 14, 2000

Related U.S. Application Data

(63) Continuation-in-part of application No. 08/988,864, filed on Dec. 11, 1997, now abandoned, which is a continuation-in-part of application No. 08/685,334, filed on Jul. 23, 1996, now Pat. No. 5,840,185.

(51) Int. Cl.[7] .............................. B67D 5/58; B01D 27/04
(52) U.S. Cl. ..................... 210/232; 210/282; 210/479; 210/469; 222/189.07; 222/189.1; 215/308; 215/388
(58) Field of Search ................................ 210/232, 238, 210/282, 460, 497.01, 473, 469, 474, 475, 482, 477, 478, 479, 481, 136; 215/308, 388; 222/189.1, 189.07

(56) References Cited

U.S. PATENT DOCUMENTS

| | | | | |
|---|---|---|---|---|
| 967,095 A | * | 8/1910 | Hagg | |
| 5,122,272 A | * | 6/1992 | Iana et al. | |
| 5,417,860 A | * | 5/1995 | Kay | |
| 5,431,813 A | * | 7/1995 | Daniels | |
| 5,652,008 A | * | 7/1997 | Heiligman | |
| 5,653,878 A | * | 8/1997 | Reid | |
| 5,840,185 A | * | 11/1998 | Hughes et al. | |
| 5,928,512 A | * | 7/1999 | Hatch et al. | |
| 6,136,189 A | * | 10/2000 | Smith et al. | |
| 6,165,362 A | * | 12/2000 | Nohren, Jr. et al. | |

FOREIGN PATENT DOCUMENTS

JP 60-153993 * 8/1985

* cited by examiner

Primary Examiner—Joseph W. Drodge
Assistant Examiner—Terry K. Cecil
(74) Attorney, Agent, or Firm—Steven C. Petersen; Hogan & Hartson, LLP

(57) ABSTRACT

Embodiments of a portable water filter are described and shown, each embodiment being adapted to fit and seal into a bottle neck without modification of, or attachment to, the bottle or its cap or other closure. The filter has a flange system that rests on the lip of the bottle neck and that has slanted or curved surfaces to seal with the neck and the bottle cap when the cap is screwed onto the bottle. The filter further includes a connector for attachment to a straw for an alternative use of the filter in a cup or mug. The filter water inlets are preferably in the lower region of the filter housing, to facilitate suctioning of the liquid from the bottom of the cup or mug even when the liquid level is low. Additional liquid inlet(s) may be added to the upper region of the filter housing, preferably sized and located to drain the last, small amount of liquid in the neck of a bottle when the bottle is inverted, without sucking in enough air in the mug-use application to interfere with adequate draining of the mug or cup.

44 Claims, 14 Drawing Sheets

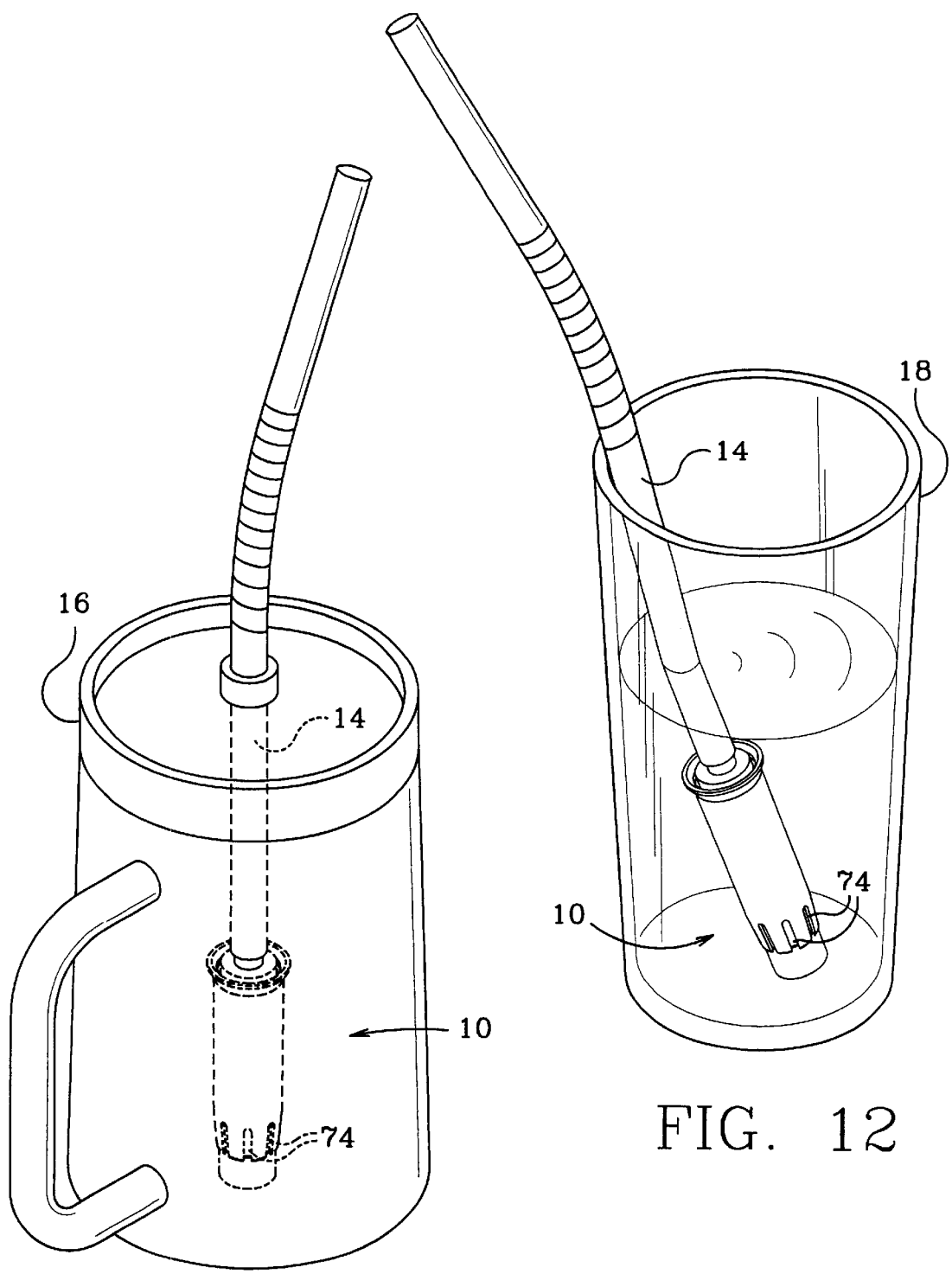

UNIVERSAL FILTER FOR SODA POP AND BOTTLED WATER BOTTLES

CROSS-REFERENCE TO OTHER PATENT APPLICATIONS

This application is a continuation-in-part of a prior, U.S. patent application, entitled "Universal Filter for Soda Pop and Bottled Water Bottles," filed Dec. 11, 1997, Ser. No. 08/988,864, now abandoned, which in turn is a continuation-in-part of U.S. Pat. application, entitled "Sports Bottle Filter Cartridge," filed Jul. 23, 1996, Ser. No. 08/685,334, now U.S. Pat. No. 5,840,185, all of which are herein incorporated by reference.

BACKGROUND OF THE INVENTION

1. Field of the Invention

This invention relates generally to portable water filters for removing chlorine and other components that contribute to poor taste and odor. More specifically, this invention relates to a water filter that (i) may be either inserted into the neck of many current commercial plastic soda pop and mineral water bottles to make desirable the re-use of these bottles for drinking filtered tap water or (ii) attached to a straw and used in an open container such as a mug.

2. Description of the State of the Art

Today there is a growing awareness of problems with our tap water. Many people are mainly concerned with the taste of tap water, and secondarily concerned for health-related problems due to contaminants in water. Because of this, there have been increased sales of bottled water and of home water filters over the past ten years. Since it is often difficult to find clean, chlorine-free drinking water away from home, bottled water has become the accepted method of finding potable drinking water while away from home. Bottled water has also become the preferred water for home-use where the user has no need for a water filter to remove the chlorine, lead, Cryptosporidium, etc., from the tap water. Most home filtration devices are relatively expensive, which discourages families and small businesses from purchasing these filtration systems. In addition, there is the convenience factor of purchasing one or two bottles of drinking water at the supermarket. Therefore, when the consumer purchases bottled water, he or she is not just buying the water, but the convenience of having it in a half-or one-quart container.

In the typical home or business, there are many empty mineral water or pop bottles, that are destined for garbage. Because of their great numbers, it would be very convenient to reuse these soda pop or mineral water bottles for drinking water. However, as discussed above, it is usually inconvenient to produce filtered water to pour into these bottles, and, even if the consumer does so, he or she quickly consumes the bottle-full of filtered water away from home and is back to having to refill the bottle with tap water at a business, a friend's home or a public place.

There is still a need, therefore, for an economical and easy-to-use portable water filter for use with mineral water and/or pop bottles. There is still a need for such a filter that fits universally into a large number of the otherwise-discarded plastic bottles in our homes and businesses, without necessarily requiring modification of the bottles or their caps or in the alternative a filter that may be used.

SUMMARY OF THE INVENTION

Accordingly, it is a general object of this invention to provide a liquid filter system that removes chlorine, heavy metals, taste, color, odor and microorganisms from water while at the same time is simple and sanitary to use.

Another object of the invention is to provide a filter in that is so versatile that it can fit into a variety of neck bottles, including existing 28 mm system neck bottles which account for nearly all of the soda pop and mineral water bottles made and distributed throughout North America.

A further object of the invention is to provide a liquid filter system that can also be used in combination with a straw within an open container such as a mug.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, compositions, and methods particularly pointed out in the appended claims.

To achieve the foregoing and other objects and in accordance with the purposes of the present invention, as embodied and broadly described therein, the apparatus of this invention may comprise a filter media held by a container that may be inserted into a bottle neck, and a flange system connected to the container that rests on and forms a seal between the bottle neck and the bottle closure. In addition, the present invention preferably is adapted to be used with a straw, so that the straw-plus-filter unit may be used in the bottom of a mug or cup.

BRIEF DESCRIPTION OF THE DRAWINGS

The accompanying drawings, which are incorporated in and form a part of the specification, illustrate the preferred embodiments of the present invention, and together with the description serve to explain the principles of the invention.

In the Drawings

FIG. 11 is a perspective view of the filter of FIG. 1 attached to a straw for use in a mug.

FIG. 12 is a perspective view of the filter of FIG. 1 attached to a straw for use in a cup.

DETAILED DESCRIPTION OF THE PREFERRED EMBODIMENT

Figure 1:
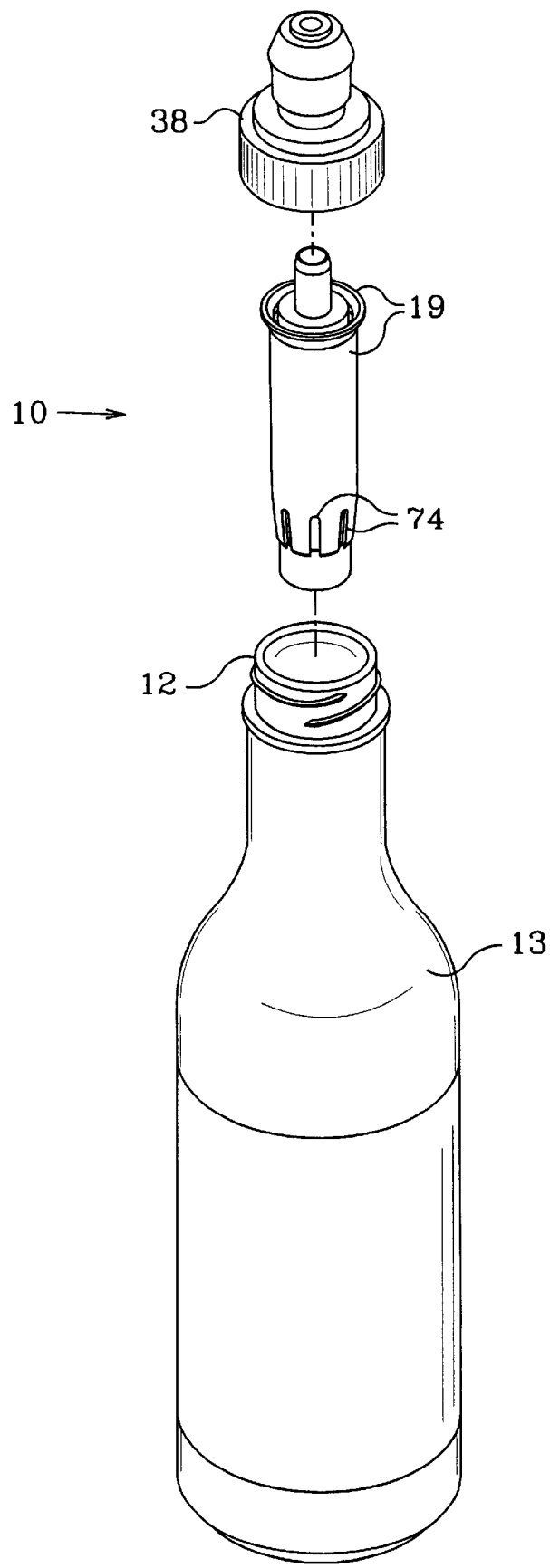
FIG. 1 shows a perspective, expanded side view of one embodiment of the invented filter system, with the filter positioned for installation in the neck of a plastic bottle.

The filter of the present invention cooperates with the necks of a variety of bottles to create an effective seal to prevent leaks and to effectively filter the bottle's contents, without the filter being connected or attached to either the bottle or to its closure, and without requiring modification of either the bottle or the closure. This is accomplished by making the filter unit just slightly smaller in diameter than the average bottle interior neck size, except for the special flange system near the top of the filter that extends radially outward over the top of the neck and that has a lower portion with a tapered/slanted outer surface that interferes slightly with the bottle neck inner surface when the filter is dropped into the neck (as shown in FIG. 5B). As the top closure is pressed down on the flange system, the flange will expand slightly to make a water tight seal with the bottle neck. This flange is preferably adapted to cooperate with a sealing member on the closure, such a generally cylindrical, downwardly-protruding, flexible ring, herein also called a "knife edge." This ring is common to many pop-top closures sold with water and pop bottles, as it is effective in sealing even a pressurized, carbonated liquid in the bottle. In some embodiments of the present invention, adaptation of the flange, to seal with the downwardly-protruding ring and to flex and seal with the bottle, may be similar to the invented sealing system of the herein-incorporated disclosure of U.S. Pat. No. 5,840,185, by Douglass Hughes, et al.

After the invented filter is inserted into the neck of a plastic bottle and a top closure is screwed down, water from the bottle passes through the filter and up through the closure to the user's mouth, as the user squeezes the sides of the plastic bottle. A top closure is necessary in this bottle-neck application to allow the filter system to function as intended. A top closure may be supplied as an accessory with the filter at the point of sale, in case a suitable closure is not available with the bottle. Alternatively, the filter has a port which may be attached to a straw and thus the filter may be used in a mug or cup.

Referring to the Figures, there are shown several, but not the only, embodiments of the invented portable water filter. The preferred filter 10 is dual-use, in that it may be either installed in a bottle neck 12, or attached to a straw 14 for use in a mug 16 or cup 18. FIGS. 1–5A, 8, and 9 illustrate the filter 10 sealed in the neck 12 of a "standard" bottle 13, which may be selected from the many bottles on the market that have an approximately 28 mm outside thread diameter neck. FIGS. 11 and 12 illustrate the filter 10 in use with a straw, at or near the bottom of a container. In either use, the filter 10 does not need to be attached to the bottle or container or any closure member, and the bottle, container, and closure member need not be modified from their standard shape and configuration for use with the invented filter 10.

Figure 8:
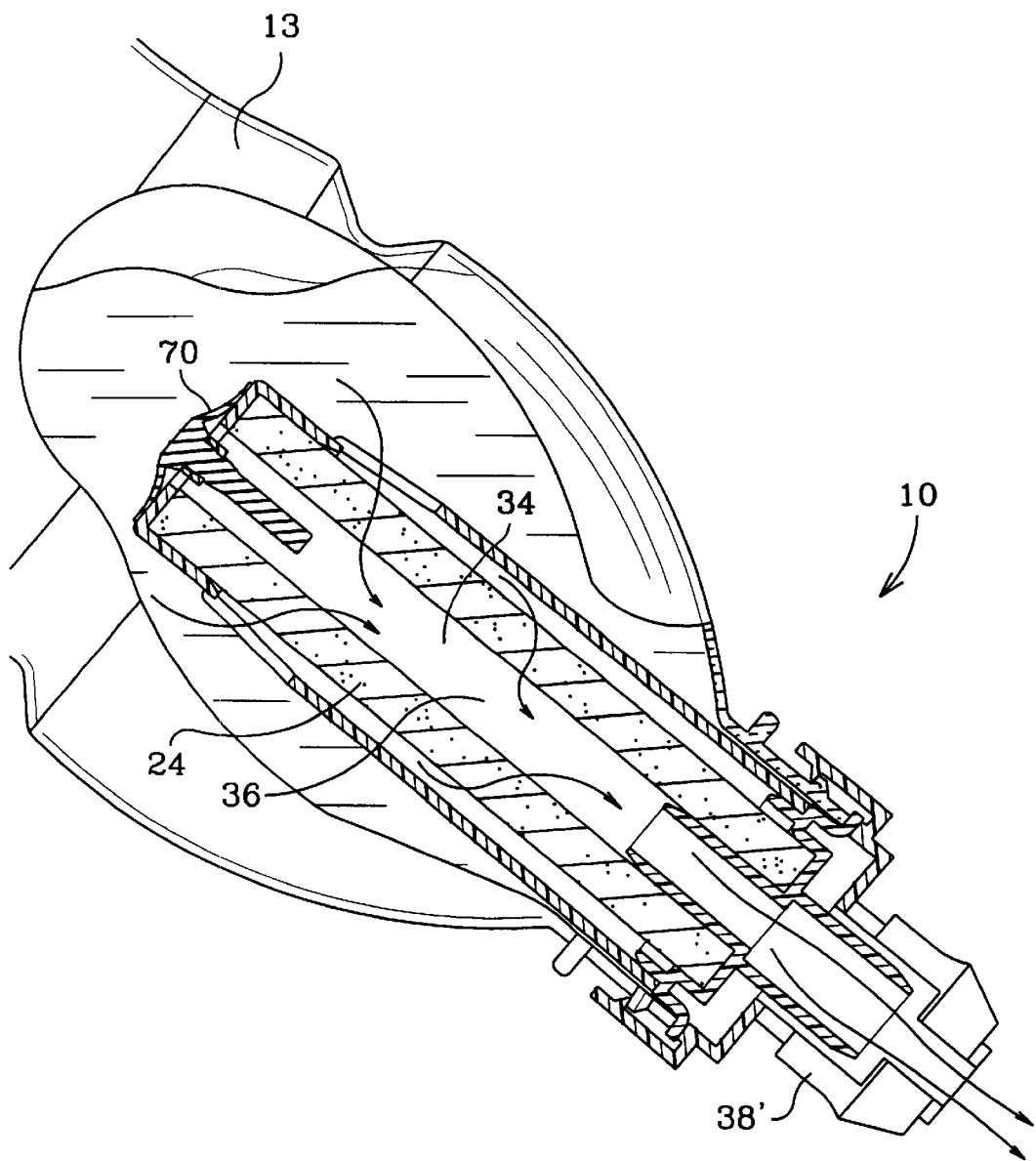
FIG. 8 is a side, cross-sectional view of the filter of FIG. 1, installed with an alternative top closure (38'), with arrows showing water flow from the squeezed bottle through the filter and through the top closure.
Figure 9:
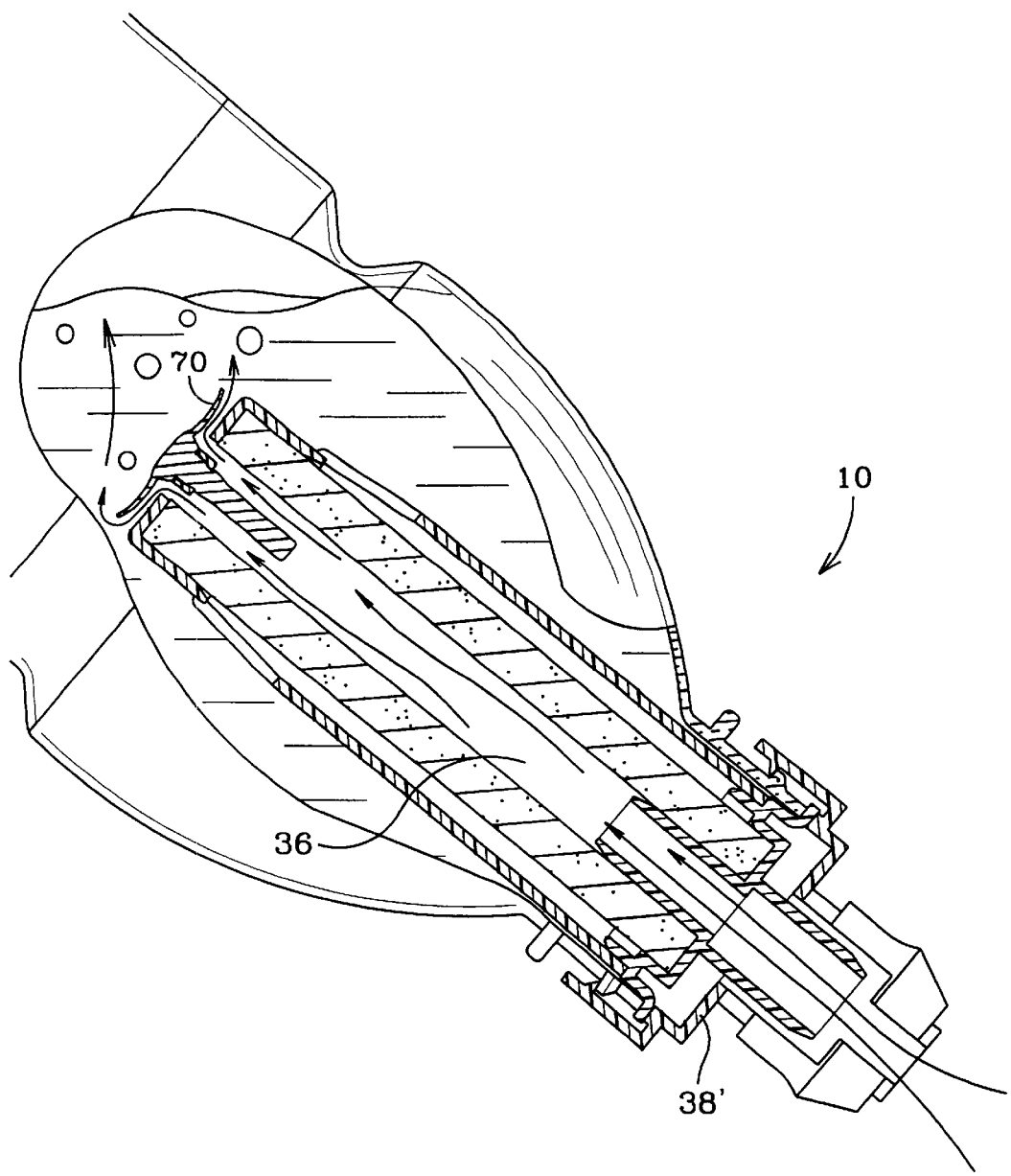
FIG. 9 is a side, cross-sectional view of the filter of FIG. 8, with arrows showing air flow through the top closure, past the umbrella valve, and into the bottle.

The filter 10 comprises a housing 19, which comprises a housing body 20 and a housing top 22. The elongated body 20 is a generally cylindrical casing, preferably constructed from a polypropylene or an ABS material, which houses or ABS, casing which houses a liquid filter 24. Filter 24 is typically a tube shaped filter which is open at both ends with an outside diameter and an inside diameter and a center core 34, made either of a solid bat liquid porous carbon block 24 or of a sintered polymer and powdered activated carbon such that the filter is liquid porous. The housing top 22 is attached to the top of the body 20 to enclose the filter tube 24 and secure the filter tube 24 inside the housing 19. The housing 19 has an aperture 30 through the center of the bottom wall of the body 20 and an aperture 32 through tie center of the housing top 22. The filter 24 has a tube-like construction with a center core 34. These housing and filter tube apertures and core result in a bore or central passage 36 extending straight though the middle of the filter 10 at the longitudinal central axis of the filter. This passage 36 is used to conduct water that has flowed radially from the outside diameter of the filter tube 24 into the core 34, and up and out the top of the filter 10 (FIG. 8). The same passage 36 is also used to conduct air returning into the bottle 13 (FIG. 9).

The housing 19 is preferably specially adapted to cooperate with the bottle neck 12 to create a seal between the filter housing and the bottle and between the filter housing and the top closure 38. The outer surface 40 of the body 20 is taped to allow easy insertion of the filter into the neck 12. The housing top 22 has a flange system, herein called the flange 50, which rests on the lip of the bottle neck 12 and seals with the inner surface of bottle neck 12. The flange 50 has a first generally vertical annular portion 41, a second generally vertical annular portion 42, a third generally vertical annular portion 45, and a generally horizontal annular portion 44 (when in the orientation shown in FIGS. 1–4). The inner surface of the second vertical annular portion 42 is radially spaced form the outer surface of the first vertical portion 41, thereby forming an annular space 43 therebetween. The outer surface 46 of the second vertical annular portion 42 has a tapered area 48 that tapers upwardly and outwardly at a about 15 degrees to vertical (preferably in the range of 10–20 degrees). This tapered area 48 around the housing top 33 seals with the top inner surface 52 of the bottle neck 12, especially when the flange 50. The third vertical annular portion 45 is formed integrally with a lower end of each of the first and second vertical annular portion 41 and 42, respectively, to define a bottom 47 of the annular space 43. The outer surface 49 of the third vertical annular portion 45 abuts the inner surface of the housing body 20.

In general, the invented filter may be said to insert itself between the bottle neck and the top closure without disrupting the original sealing mechanisms. The filter flange surfaces replicate original sealing surfaces to an extent that allows the top closure and bottle to seal to the filter instead of to each other.

In use in the bottle neck, the top closure 38, 38', screws down onto the neck 12, with the horizontal portion 44 of the flange 50 between the top surface of the neck and a portion of the bottom surface of the closure 38, 38'. Typically, the portion of the closure bottom surface that contacts the flange 50 comprises a cylindrical shoulder 54 that protrudes downward from the closure. This shoulder in many, if not all, embodiments of so-called 28 mm style closures available on the market today is expected to contact the upper surface horizontal portion 44 (as shown in FIGS. 5B and 5C) sufficiently to create a seal between the closure 38, 38' and the horizontal portion 44. In addition, the shoulder 54 preferably places enough pressure on the flange 50 to slightly flex it outward to seal against the neck inner surface, as discussed above.

Figure 5A:
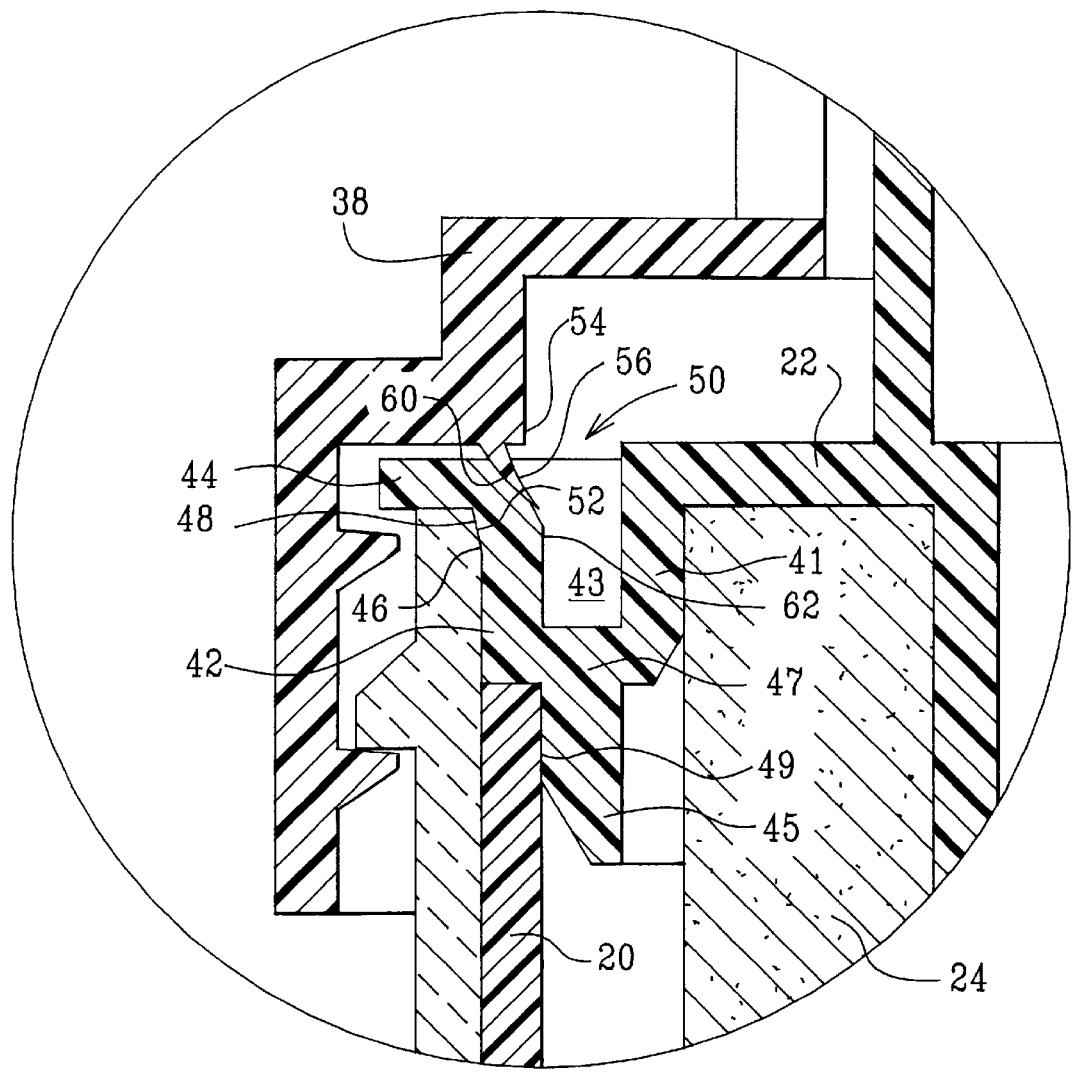
FIG. 5A is an enlarged, detailed view of the preferred sealing flange system of the invented filter of FIG. 1 indicated by dashed lines in FIG. 4.
Figure 5B:
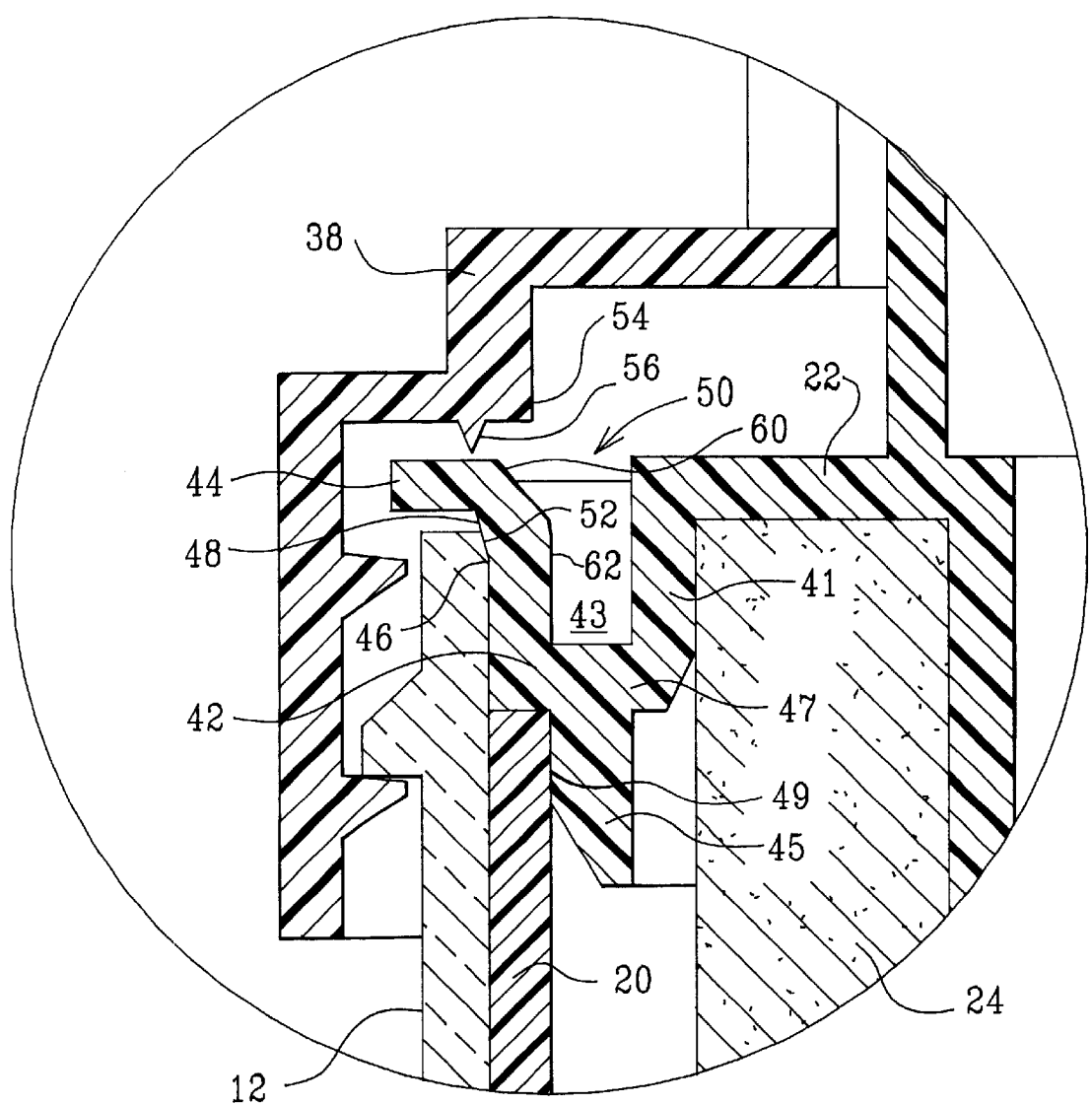
FIG. 5B is an enlarged, detailed view of the sealing flange system of the present invention similar to the view shown in FIG. 5A but illustrating an alternative connection between the sealing flange system of the present invention and the bottle closure prior to tightening the bottle closure on the bottle neck.
Figure 5C:
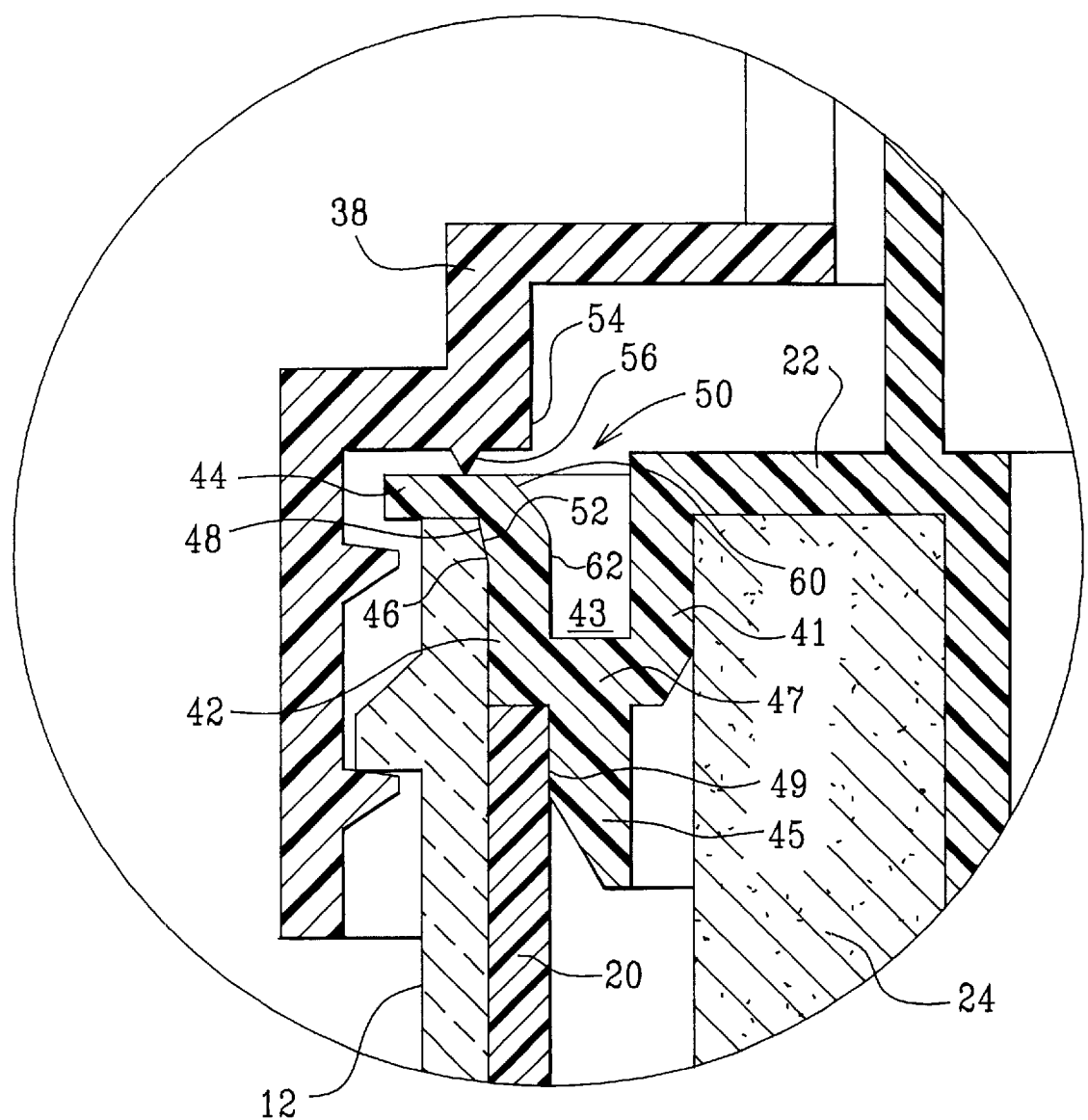
FIG. 5C is an enlarged, detailed view of the sealing flange system of FIG. 5B illustrating the alternative location of contact between the sealing flange system of the present invention and the bottle closure top after tightening to obtain a water tight seal.
Figure 6:
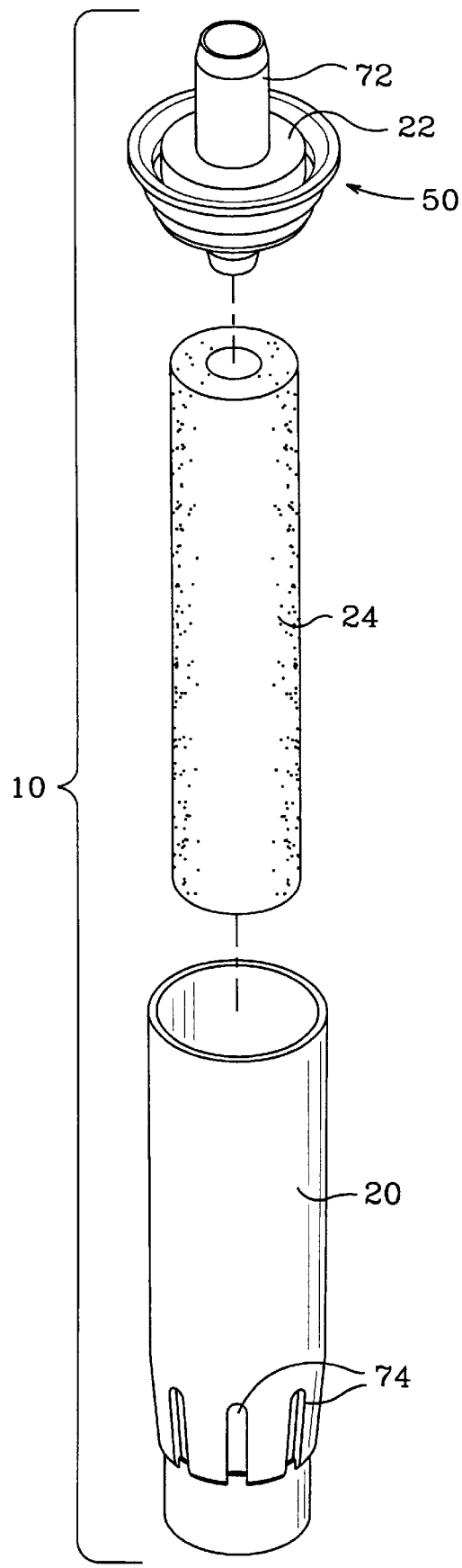
FIG. 6 is a perspective, expanded side view of the filter embodiment of FIG. 1.
Figure 7:
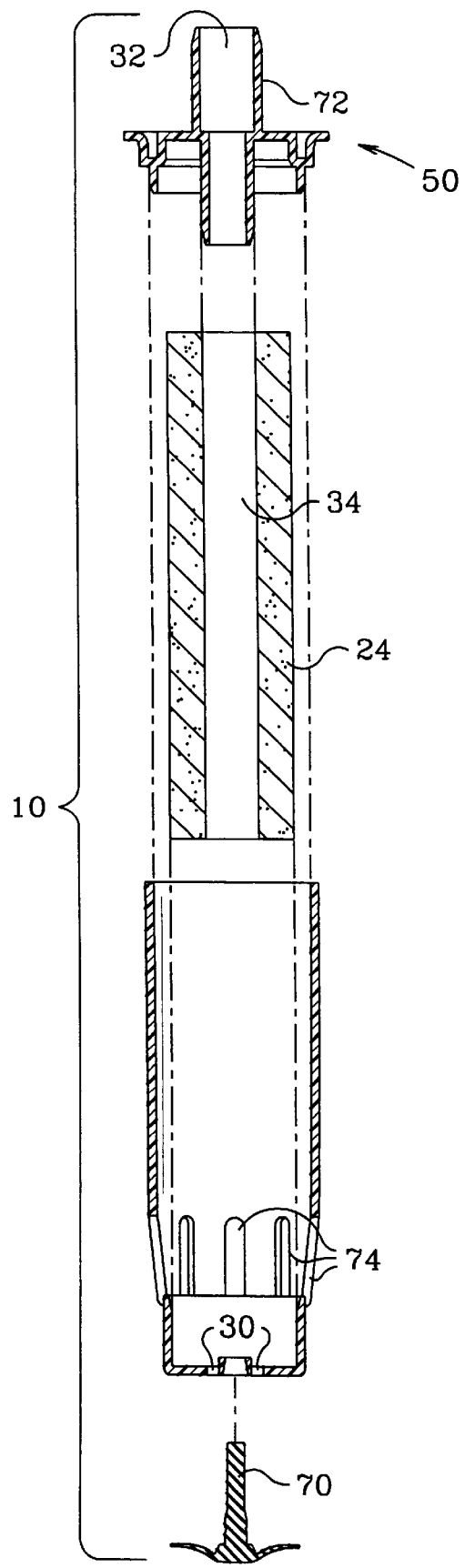
FIG. 7 is a cross-sectional, expanded side view of the filter embodiment of FIG. 1.

In the preferred embodiment of the top closure 38 and sealing system shown in FIG. 5A, the shoulder 54 includes a thin, flexible generally downwardly-protruding "knife edge" ring or annular valve seal 56 that, as the contacting member for abutting against, and sealing with, the flange 50. The preferred flange 50, therefore, has a slanted and/or radiused corner that forms the transition between the upper surface of the horizontal annular portion 44 and inner surface of the second vertical annular portion 42. This slanted and/or radiused corner provide a surface for the annular valve seal 56 to contact and seal against, as the tend to flex inward as it is forced down against the flange. Thus, the annular valve seal 56 take the general shape shown in FIG. 5A, sealing effective against the flange and applying pressure to slightly flex the flange outward. 5A, the shoulder 54 includes a thin, flexible, generally downwardly-protruding "knife edge" ring or annular valve seal 56 that acts as the contacting member for abutting against, and sealing with, the flange 50. The preferred flange 50, therefore, has a slanted and/or radiused corner that forms the transition between the upper surface of the horizontal annular portion 44 and the inner surface of the second vertical annular portion 42. This slanted and/or radiused corner provides a surface for the annular valve seal 56 to contact and seal against, as the ring tends to flex inward as it is forced down against the flange. Thus, the annular valve seal 56 takes the general shape shown in FIG. 5A, sealing effectively against the flange and applying pressure to slightly flex the flange outwards The most preferred embodiment of the corner of the flange 50, shown in FIG. 5A, includes a slanted area 60 (at about 45 degrees from horizontal) that joins to a radiused area 62 (at about R .125 inches). This preferred slant and radius combination provides an effective sealing surface, but other slants and curvatures may also be operable, for example slants in the range of 30–60 degrees or other ranges. In general, the corner may be described as more effective if it is "rounded off" or radiused. Whereas the preferred slanting of the corner as disclosed in the herein-incorporated U.S. Pat. No. 5,840,185 (10–20 degrees from vertical), is most effective for a typical sports bottle downwardly-protruding annular valve seal, the most effective corner shape for use with the thin, flexible annular valve seal 56 of this closure and bottle design has been found to be a radiused corner with a 45-degree slant near the top of the corner. In an alternate embodiment, as briefly described above and illustrated in FIGS. 5B and 5C, effective sealing surfaces are obtained between the neck 12, the flange 50, and the top closure 38, 38' when the thin, flexible annular valve seal 56 contacts the flat, upper surface of the horizontal annular portion 44 of the flange 50, rather than mating with slanted area 60 of the flange 50 as in FIG. 5A. The present invention provides effective sealing because as tie top closure 38, 38' is screwed down onto the neck 12 the flexible annular valve seal 56 compresses as it is pressed against the horizontal annular portion 44 to provide a circular sealing surface between the top closure 38, 38' and the flange 50. Additionally, as discussed above shoulder 54 of the top closure 38, 38' applies sufficient pressure on the flange 50 to slightly flex it outward against the neck 12 inner surface to obtain a tight seal between the flange 50 and the neck 12. More particularly, FIG. 5B illustrates initial assembly with flange 50 inserted into neck 12 having a slightly smaller inner diameter than the outer diameter of the flange 50 and with annular valve seal 56 of top closure 38, 38' about to make contact with horizontal portion 44 of flange 50. The tapered area 48 of the second vertical annular portion 42 of the flange 50 abuttingly) contacts the neck 12 but a gap is formed between the horizontal annular portion 44 of the flange 50 and the neck 12, because as discussed above the radius of tapered area 48 is greater than the inner radius of bottle neck 12. Hence, tapered area 48 extends radially outward over the top of the neck 12 and thus rests on the bottle neck 12 when filter 10 is initially inserted into the bottle neck 12.

Referring to FIG. 5C, the invention is illustrated fully assembled with the top closure 38, 38' tightly screwed onto the neck 12. During the tightening of the top closure 38, 38', the flexible annular valve seal 56 contacts the horizontal portion 44 of the flange 50 and pushes or presses the flange 50 into the neck 12 until the lower surface of horizontal portion 44 contacts the top of the neck 12. The material of the flexible annular valve seal 56 deforms slightly to form a sealing surface with the horizontal surface 44. By forcibly pressing the larger flange 50 into the inner diameter of the neck 12, the upper portion of the neck 12 is pushed slightly outward and the radiused area 62 of the flange is pushed slightly inward. In this manner, a tight seal is formed between the flange 50 and the neck 12. This unique sealing feature facilitates the use of the filter 10 of the present invention in bottles 13 with necks 12 that vary slightly in size from standard sizes and with top closures 38, 38' that have annular valve seals 56 at differing locations than that shown in FIG. 5A.

Although the invention includes other means of encasing and directing flow through a filter tube, the preferred housing is elongated to fit easily inside a narrow bottle neck. Additionally, the preferred elongated design with radial flow through the tubular filter element, provides a large surface area allowing lower flow resistance for the water and resists clogging of the carbon filter pores, which can be a concern with small pore sizes.

Manufacture of the filter housing 19 may be of any plastic material such as, but not limited to, polypropylene or ABS, while the filter tube 24 may be of powdered activated carbon which has been formed into a solid but liquid porous carbon block through compression or extrusion, or the tube may be formed through sintering with a powdered polymer to create a liquid porous plastic tube. The invented housing and filter tube design allow for a press fit of the housing around the carbon block, which is preferred as an easy and inexpensive assembly technique. Alternatively, conventional assembly and connection methods may be used, such as hot melt adhesives or spin welding.

Figure 2:
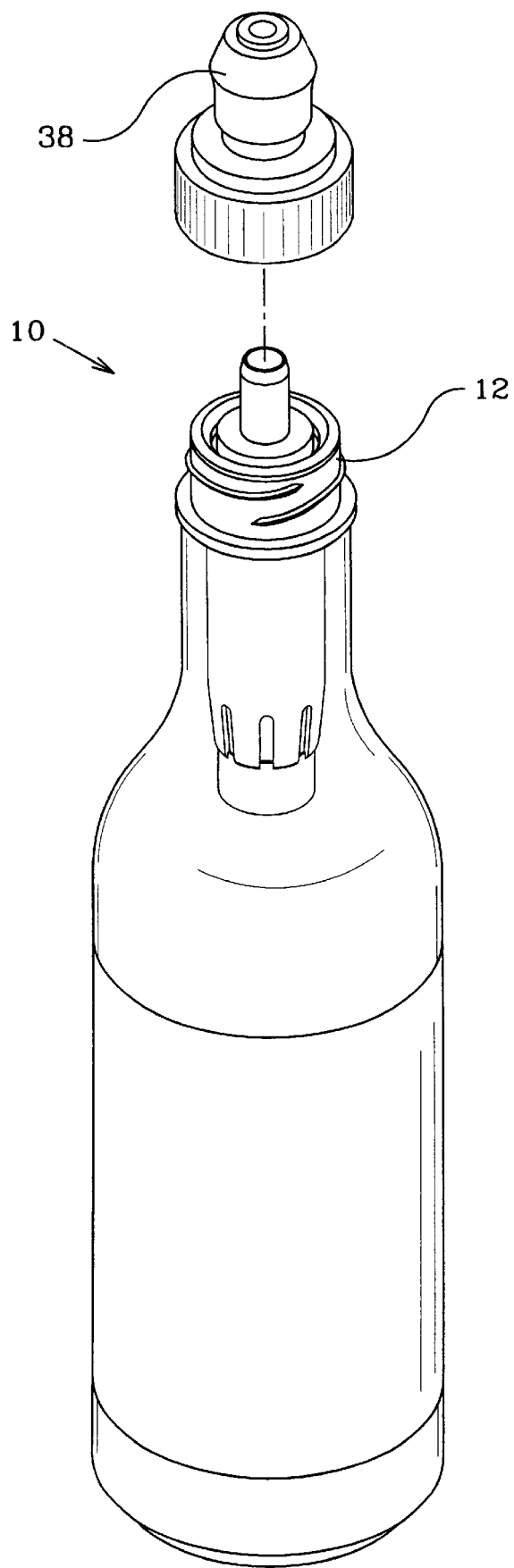
FIG. 2 shows a perspective, expanded side view of the embodiment of FIG. 1, with the filter positioned in the bottle neck.
Figure 3:
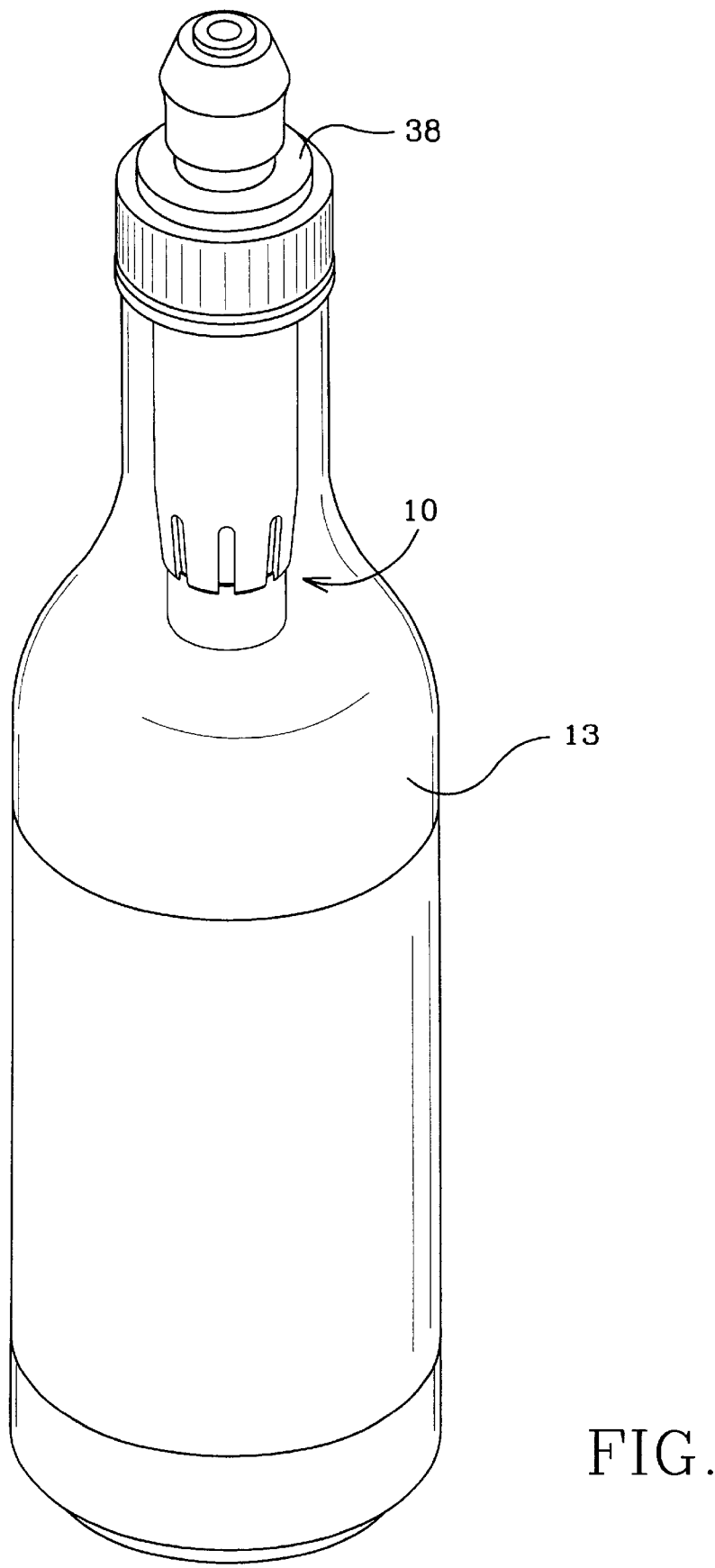
FIG. 3 shows a perspective, expanded side view of the embodiment of FIG. 1, with the filter positioned in the bottle neck and the top closure installed to seal the filter in the bottle.
Figure 4:
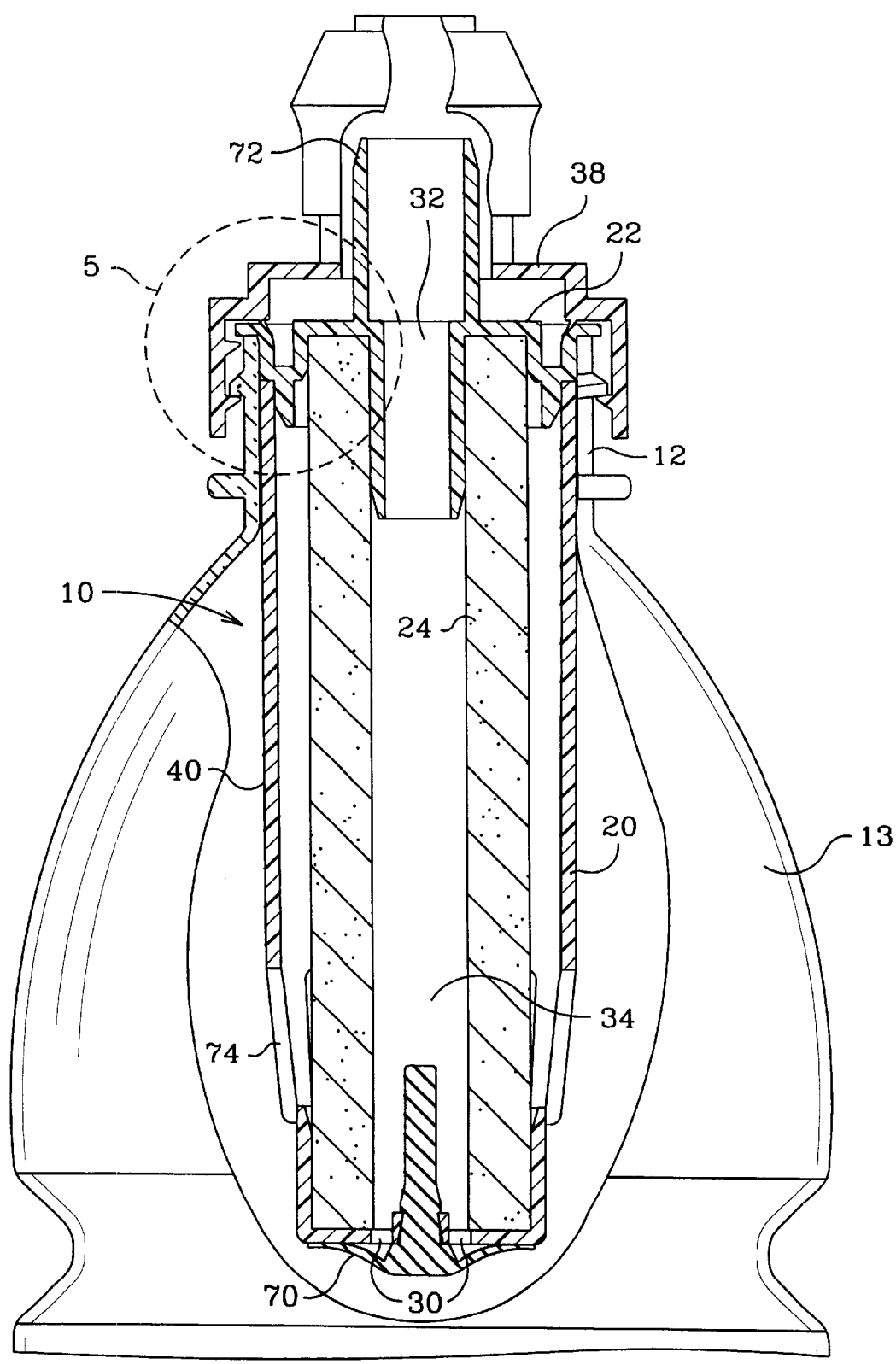
FIG. 4 shows a cross-sectional, side view of the filter of FIG. 1, installed in an alternative embodiment of a plastic bottle.

In use in a plastic bottle neck, the filter 10 is inserted into the bottle neck as shown in FIGS. 1–3 and as described above. As the plastic bottle 13 is squeezed, water is purified as it is forced through the filter tube. As the user releases the bottle, it remembers its original shape and attempts to return to that shape. In doing so, the bottle sucks in air from the atmosphere, The air in this case passes through the center passage 36 and down to the bottom of the filter housing body 20, where it exits through an umbrella valve 70, preferably made of silicone, but it may also be made of ethylene propylene (for example, "EPDM").

The umbrella valve 70 is a one-way valve that collapses flat against the bottom surface of the filter housing body when the bottle is squeezed, but opens easily as air pushes against it from the opposite direction. Essentially, it opens the same way an umbrella would inappropriately collapse if pointed away from the wind. The use and position of this umbrella valve enables the filter tube's matrix 24 to be made with a much tighter median pore diameter (about 30–60 micron ranges) than it would if the path of air return were through the filter tube itself (where about 80 micron median pore diameter or higher would be necessary). This is because the pore diameter of the carbon tube would otherwise be left more open since the air would not easily return through a pore diameter much smaller than that. However, with the air-return path being through the central passage 36 and the umbrella valve 70, the pore diameter of the filter tube is able to be brought down to a more preferred smaller range.

This tighter pore size has several advantages. First, it creates a more tortuous pathway for the water, which in turn provides increased contact between the water and the activated carbon in the filter tube. The increased contact accelerates the chlorine and lead reduction adsorption processes. A second advantage is the tighter pore diameter range creates a tortuous pathway for water-borne parasites commonly found in municipally treated tap water, for example, the Cryptosporidium, and Giardia lamblia that are estimated to be in 39% of all U.S. tap water. Thus, the invented filter also may be used to effectively reduce water-borne parasites from municipally treated water.

Another advantage of the umbrella valve is that it quickly returns air into the bottle so that the user is able to drink rapidly without having to first wait for the air to return through the filter and, second, to have to squeeze the water back into the filter tube each and every time another drink is taken. Another advantage of the umbrella valve 70 is that it puts less stress on the bottle. As the bottle's memory returns it to its original shape, it must work against any obstruction in the air pathway. If the air were forced to return through the wall of the carbon block, it would put greater stress on the plastic bottle.

The invented filter is intended to be a dual-use filter, and includes a stem 72 protruding from the housing top 22 of filter unit 10, for enabling the filter 10 to be attached to a drinking straw and used in any open container for liquids such as, but not limited to a cup, mug, or the common mug with a straw attached. In use as a "loose" filter for purifying liquid in a non-bottle-shaped container of liquid, the stem 72 or other straw attachment port of the housing top 22 is pushed into the end of a typical high-density polyethylene straw tube or alternatively a so-called memory straw that is designed to bend and hold its shape. The stem 72 may fit inside the straw tube or memory straw and hold it through interference or friction thereby creating a watertight seal. Alternatively, some flexible tubing has a smaller outside diameter. In this case the stem 72 is designed in such a way to also receive a smaller tube on the inside diameter of the same stem 72. This inside diameter features a very slight draft so that as the tube is pushed down into it, the draft increases the friction or interference, thereby holding it even more firmly and make it less likely to inadvertently come apart. The combined straw-filter unit may be placed inside the container. This system works well in a wide variety of containers, such as mugs 16 or cups 18. As the user sucks on the straw, water flows through the inlets 74 in the housing body rather than through the housing body aperture 30. For "air return," an open cup simply replaces the filtered liquid with air from the atmosphere. Covered mugs, such as shown in FIG. 11, typically provide their own air return through an opening in the mug's cap. Other containers provide an adjustable plug, which can be closed for transportation and opened for use. In any case, when in use with a straw, the filter 10 may not need to provide for an air return, and the umbrella valve 70 need not perform the role of an air-return valve as it does in the bottle neck scenario.

The location of the valve 70 at the bottom of the filter is well-suited for use with a straw tube, as it closes effectively even when there is only a little liquid in the bottom of the cup or mug. Also, because of the valve's location, it in no way obstructs the use of the filter with the straw. Thus, the invented filter may be interchangeably used either installed in a bottle neck for squeezing of water through the filter, or inserted with a straw into the bottom of a cup or mug for sucking of water through the filter and the straw. No filter found today has the advantages of being so universal that a specific container is not needed. Empty plastic bottles are everywhere, as well as mugs and containers using straws. Mug-style containers are even given away at fast food restaurants to promote the restaurant. Empty soda pop or mineral water bottles are disposed of as trash. The invented filter may therefore become an economical and easy-to-use accessory for making these containers reusable and for making tap water a more desirable and pleasant drink.

In either bottle-use or cup/mug use, the filter housing serves several functions. It cosmetically covers the filter tube, which is most often a black, carbonaceous material, protects it, and provides a means for holding it in place in the bottle neck. In addition, the filter housing also serves to define the water inlet points and to direct water and air flow. The preferable placement of the water inlets 74 is near the bottom of the housing body. These perforations in the housing body arc preferably elongated and are spaced around the circumference of the body, but preferably extend about ¼–⅓ of the wall up the wall of the body. I this way, when used in the bottom of a mug or cup, nearly all the liquid may be sucked up through the straw. Also, in most bottles, depending on the neck diameter and geometry, this water inlet 74 is effective in emptying all but a small amount of liquid from the bottle The small amount left in the bottle may be described generally as the volume between the bottle neck and the water inlets 74, which remains in the bottle when the bottle is tipped up for drinking.

Figure 10:
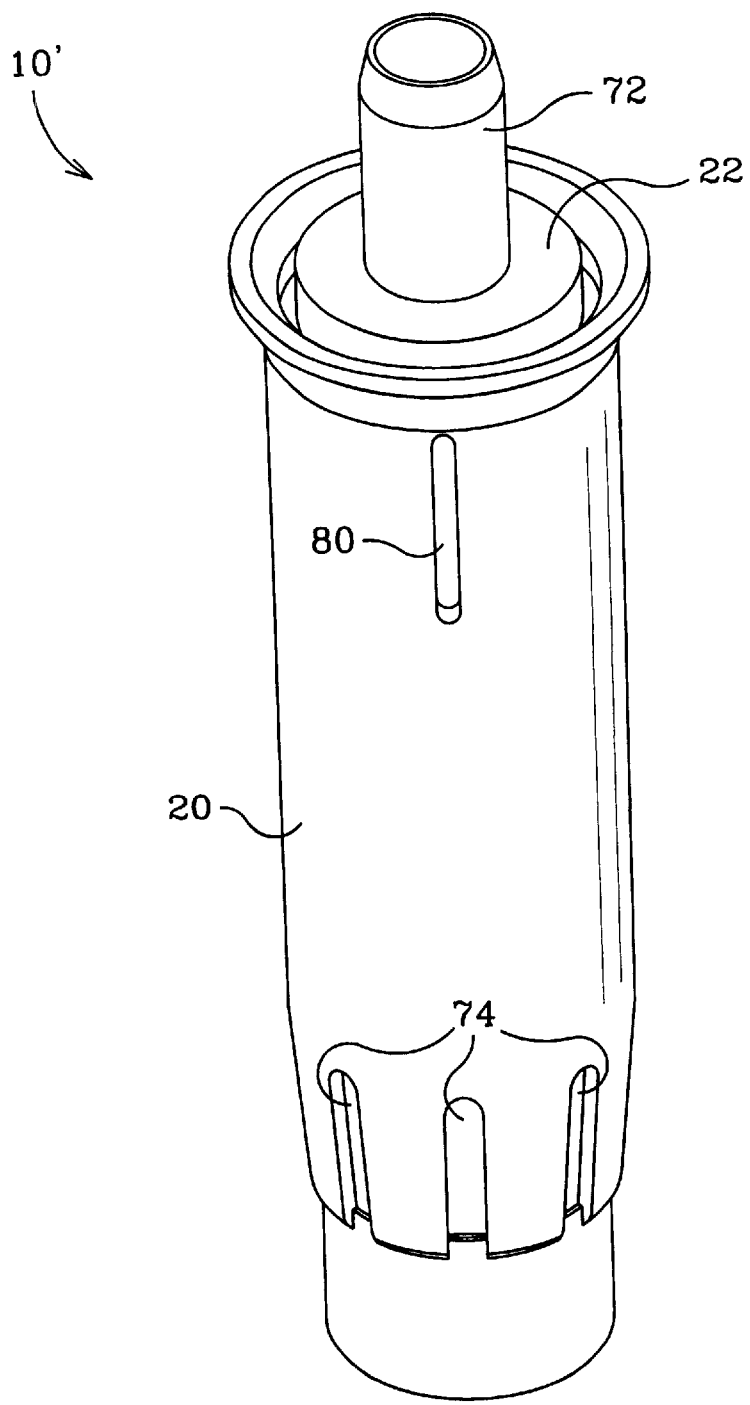
FIG. 10 is a perspective view of another embodiment of the filter, including a slit for draining the last liquid from an inverted bottle.

Optionally, as shown in the filter 10' of FIG. 10, one or more slits 80 may be added to the housing 19 at or top of the housing 20, in order to allow complete or nearly complete emptying of the bottle. One slit 80 of about ¾ inch length and about 1⁄32–1⁄16 inch width is preferably located at the top of the body, and serves as an additional water inlet near the top of the filter (in the neck, which is the "bottom" of the bottle when the bottle is inverted for finishing the drink). This single slit is sized and located to drain that last amount of water, but is small enough that it does not significantly interfere with use of the filter with a straw. When in a cup or mug, little or no air passes through the slit 80 and through the carbon filter even when the liquid level is below the slit 80, and so little or no effect of the slit 80 is noticed in the straw application.

Figure 13:
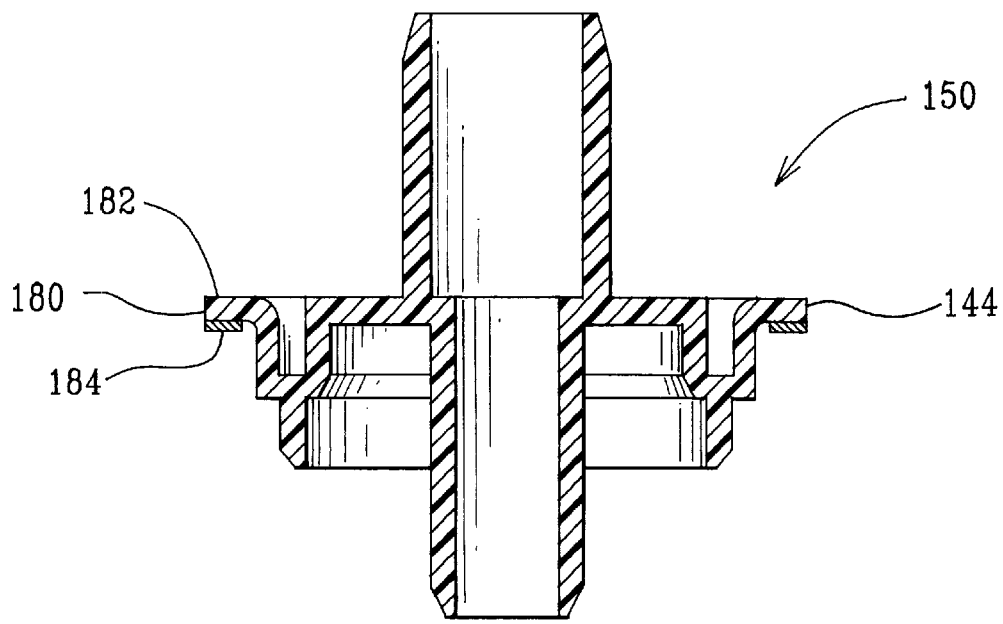
FIG. 13 is a side, cross-sectional view of the filter flange system of FIG. 6, having a gasket installed on the flange's lower surface.
Figure 14:
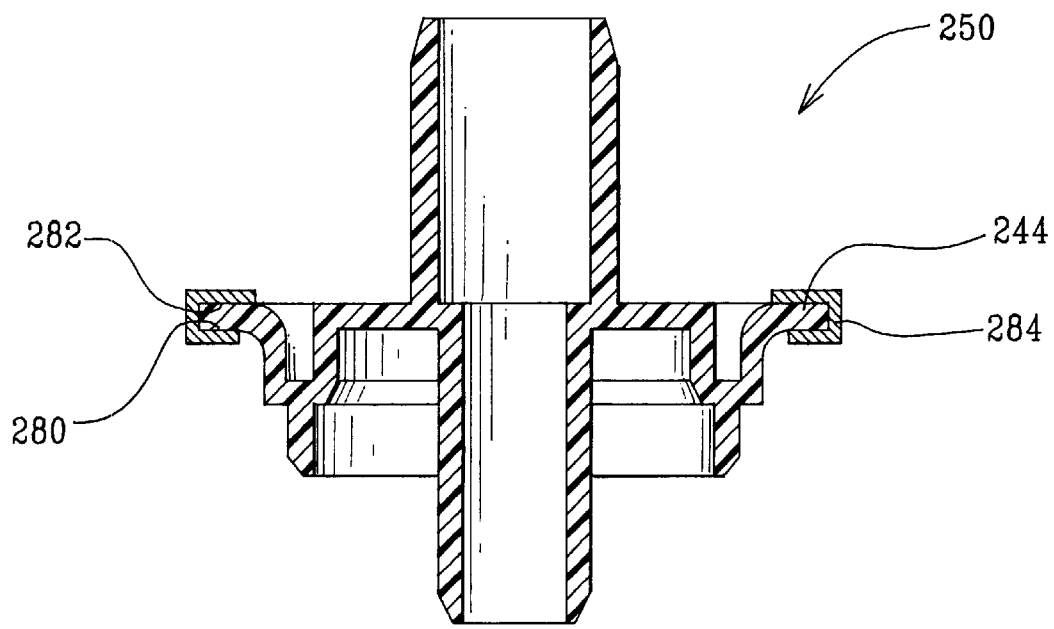
FIG. 14 is a side, cross-sectional view of the filter flange system of FIG. 6, having a gasket installed on the flange's lower and upper surfaces.

In alternate embodiments, shown in FIGS. 13 and 14 flanges 150 and 250, respectively, may further comprise a resilient material to create a seal much like a rubber gasket. For use with a geometry like flange 150 or 250 this seal may be made by a separate gasket, or co-molded onto the flange 150 or 250 of the filter. The resilient material is co-molded onto the flange and may be a thermoplastic elastomer material such as by brands Kraton and Sanoprene. As shown in FIG. 13 the resilient material 184 is shown to reside only on the bottom surface 180 of horizontal portion 144 of flange 150 and not on the upper surface 182 of the horizontal portion. Alternatively, the resilient material 284 could reside on the upper surface 282 and the bottom surface 280 of horizontal portion 244 of flange 250, as shown in FIG. 14.

The foregoing description is considered as illustrative only of the principles of the invention. The words "comprise," "comprising," "include," "including," and "includes" when used in this specification and in the following claims are intended to specify the presence of one or more stated features, integers, components, or steps, but they do not preclude the presence or addition of one or more other features, integers, components, steps, or groups thereof. Furthermore, since a number of modifications and changes will readily will readily occur to those skilled in the art, it is not desired to limit the invention to the exact construction and process shown described above. Accordingly, all suitable modifications and equivalents may be resorted to falling within the scope of the invention as defined by the claims which follow.

What is claim is:

1. A portable liquid filter for use with a bottle and a bottle closure having a bottom surface, wherein the filter comprises no means of attachment to the bottle and no means of attachment to the closure, said filter comprising:
    (a) a container having a top end and a bottom end for being received inside a bottle neck having a top end;
    (b) a filter media received by said container and having a top end, a bottom end and an outer surface; and
    (c) a flange system connected to said top end of said container for holding said container in the bottle neck and comprising:
        (i) a generally horizontal annular portion having an upper surface, an inner surface and a lower surface, wherein said horizontal annular portion extends between and forms a seal with the top end of said bottle neck and the bottom surface of said bottle closure;
        (ii) a first generally vertical annular portion having an inner surface circumjacent to the outer surface of said filter media and an outer surface;
        (iii) a second generally vertical annular portion having an inner surface radially spaced from said outer surface of said first vertical annular portion thereby forming an annular space therebetween and which is substantially perpendicular to said horizontal annular portion, wherein said second vertical annular portion has an outer surface having an outer diameter which gradually increases until it meets said lower surface of said horizontal annular portion thereby forming an outwardly slanted area for sealing with the bottle neck; and
        (iv) a third generally vertical annular portion formed integrally with a lower end of each of said first and second vertical annular portions and defining a bottom of said annular space, said third vertical annular portion including an outer surface abutting an inner surface of said container.

2. The filter as in claim 1, further comprising a slanted area at 45 degrees from horizontal near the top of the inner surface of said second vertical annular portion for sealing with a generally downwardly protruding sealing ring of a closure.

3. The filter as in claim 2, wherein said annular space is about 0.125 inches.

4. The filter as in claim 1, wherein said outwardly slanted area is slanted outward at about 15 degrees from vertical for sealing with the bottle neck.

5. The filter as in claim 1, wherein the filter media is a carbon block.

6. The filter as in claim 1, wherein the container substantially surrounds the filter media.

7. The filter as in claim 1, further comprising a stem extending from the top end of said container and in fluid communication with the filter media for connection to a straw.

8. The filter of claim 7, further comprising a drinking straw, wherein said filter media is operatively connected to said straw.

9. The filter as in claim 1, wherein the filter is elongated for being generally coaxial with the bottle neck and has fluid inlets in the bottom ¼–⅓ of the container.

10. The filter as in claim 9, further comprising at least one fluid inlet near the top end of the container.

11. The filter as in claim 1, wherein said horizontal annular portion extends out past the outer diameter of said bottle neck.

12. The filter as in claim 1, wherein said horizontal annular portion has a resilient material positioned adjacent to the lower surface of said horizontal annular portion.

13. The filter as in claim 1, wherein said horizontal annular portion has a resilient material positioned adjacent to the lower surface and the upper surface of said horizontal portion.

14. The filter of claim 1, filter comprising an umbrella valve positioned in the bottom end of said container.

15. A portable liquid filter for use with a bottle and a bottle closure having a downwardly protruding sealing ring, the filter comprising:
    (a) a container having a top end and a bottom end for being received inside a bottle neck;
    (b) a filter media having an outer surface and received by the container; and
    (c) a flange system connected to said top end of said container for holding the container in the bottle neck and comprising:
        (i) a generally horizontal annular portion which extends between and forms a seal with the bottle neck and said bottle closure;
        (ii) a first generally vertical annular portion having an inner surface circumjacent to the outer surface of said filter media and an outer surface;
        (iii) a second generally vertical annular portion having an inner surface radially spaced from said outer surface of said first vertical portion thereby forming an annular space therebetween for sealing with the closure sealing ring and an outer surface, wherein said outer surface of said second vertical annular portion has an area slanted outward from vertical to said horizontal annular portion for sealing with the bottle neck; and
        (iv) a third generally vertical annular portion formed integrally with a lower end of each of said first and second vertical annular portions and defining a bottom of said annular space, said third vertical annular portion including an outer surface abutting an inner surface of said container.

16. The filter as in claims 15, wherein said annular space is about 0.125 inches.

17. The filter as in claim 15, wherein said inner surface of said second vertical annular portion further has a slanted area at about 45 degrees from horizontal for sealing with the closure sealing ring.

18. The filter as in claim 15, wherein said area slanted outward from vertical is slanted outward at about 15 degrees from vertical for sealing with the bottle neck.

19. The filter as in claim 15 wherein the filter media is a carbon block.

20. The filter as in claim 15, wherein the container substantially surrounds the filter media.

21. The filter as in claim 15, firer comprising a stem extending from said top end of said container in fluid communication with the filter media for connection to a straw.

22. The filter of clam 21, further comprising a drink straw, wherein said filter media is operatively connected to said straw.

23. The filter as in claim 15, wherein the filter is elongated for being generally coaxial with the bottle neck and the filter has fluid inlets in the bottom ¼–⅓ of the container.

24. The filter as in claim 23, further comprising at least one fluid inlet near the top end of the container.

25. The filter as in claim 15, wherein said horizontal annular portion extends out past the outer diameter of said bottle neck.

26. The filter of claim 15, further comprising an umbrella valve positioned in the bottom end of said container.

27. A dual purpose portable liquid filter for use within either a bottle neck sealed by a bottle closure or with a straw, the filter comprising:
(a) a filter media received by a container having a top end, a bottom end, and an outer surface;
(b) a flange system connected to said top end of said container comprising:
(i) a generally horizontal annular portion having an upper surface and a lower surface;
(ii) a first generally vertical annular portion having an inner surface circumjacent to the outer surface of said filter media and an outer surface;
(iii) a second generally vertical annular portion having an inner surface radially spaced from said outer surface of said first vertical annular portion thereby forming annular space therebetween;
(iv) a third generally vertical annular portion formed integrally with a lower end of each of said first and second vertical annular portions and defining a bottom of said annular space, said third vertical annular portion including an outer surface abutting an inner surface of said container, wherein said horizontal annular portion is positioned perpendicularly to a vertical housing wall and has a radius greater than the inner radius of the bottle neck for sitting on a lip of the bottle neck, wherein the radius of said horizontal annular portion gradually decreases until it meets with and forms the vertical housing wall thereby forming a slanted area having a radius greater than the inner radius of the bottle neck; and
(c) a stern extending from said top end of said container and in fluid communication with the filter media, said stem adapted for attachment to a straw to suction liquid from a liquid container.

28. The filter as in claim 27, wherein said horizontal annular portion extends slightly out past the outer edge of said bottle neck.

29. The filter as in claim 28, wherein the filter does not comprise any means of attachment to the bottle or to a bottle closure.

30. The filter as in claim 27, wherein the filter media is a carbon block.

31. The filter of claim 27, further comprising an umbrella valve positioned in the bottom end of said container.

32. The finer of claim 27, further comprising a drinking straw, wherein said filter media is operatively connected to said straw.

33. The filter of claim 27, wherein the bottom end of said filter container is positioned near the bottom of a non-bottle shaped liquid container.

34. A liquid filter for use with bottles having bottle necks with having bottle necks with varying inner diameters and having attachable bottle top closures including a downwardly protruding, flexible sealing ring, said filter comprising;
(a) a container having a top end and a bottom end for being received inside a neck of a bottle;
(b) a filter media having an outer surface and received by said container; and
(c) a flange connected to said container for holding said container in the bottle neck, said flange comprising:
(i) a horizontal annular portion having an upper surface and a lower surface;
(ii) a first vertical annular portion having an inner surface circumjacent to the outer surface of said filter media and an outer surface;
(iii) a second annular vertical portion having an inner surface radially spaced from said outer surface of said fist vertical annular portion thereby forming an annular space therebetween; and
(iv) a third generally vertical annular portion formed integrally with a lower end of each of said first and second vertical annular portions and defining a bottom of said annular space, said third vertical annular portion including an outer surface abutting an inner surface of said container, wherein said horizontal annular portion extends between the bottle neck and the bottle top closure when tie bottle top closure is attached to the bottle, wherein the bottle top closure applies a substantially vertical, downward force on the horizontal surface of said flange through the flexible sealing ring when the bottle top closure is attached to the bottle, and wherein continuous sealing surfaces are formed between said lower surface of said horizontal annular portion and the bottle neck and between the upper surface of said horizontal annular portion and the flexible sealing ring of the bottle top closure.

35. The filter of claim 34, wherein said second vertical annular portion of said flange has an outer diameter slightly larger tan the inner diameter of the bottle neck, whereby said sealing surface between said flange and the bottle neck is formed, at least in part, by outward forces applied by said second vertical annular portion of the flange against the bottle neck when the bottle top closure is attached to the bottle.

36. The filter of claim 34, wherein said second vertical annular portion said flange has an outer surface with an area slanted outward from vertical to said horizontal portion for abuttingly contacting the bottle neck.

37. The filter of claim 36, wherein said area slanted outward from vertical is slanted outward at about 15 degrees from vertical for sealing with the bottle neck.

38. The filter of claim 34, wherein said annular space is inwardly deformed during the attachment of the bottle top closure and the bottle neck is outwardly deformed during the attachment of the bottle top closure to obtain said sealing surface between said flange and the bottle neck.

39. The filter of claim 34, wherein said filter media is a carbon block.

40. The filter of claim 34, further comprising a stem extending from said container in fluid communication with said filter media for connection to a straw.

41. The filter of claim 40, further comprising a drinking straw, wherein said filter media is operatively connected to said straw.

42. The filter of claim 34, wherein said container substantially surrounds said filter media.

43. The filter of claim 34, wherein said filter is elongated for being generally coaxial with the bottle neck and said filter has one or more fluid inlets in the bottom ¼ to ⅓ of said container.

44. The filter of claim 34, further comprising an umbrella valve positioned in the bottom end of said container.

* * * * *